(12) United States Patent
Chang et al.

(10) Patent No.: US 9,128,676 B2
(45) Date of Patent: Sep. 8, 2015

(54) PORTABLE ELECTRONIC DEVICE

(71) Applicant: Quanta Computer Inc., Taoyuan Shien (TW)

(72) Inventors: Jung-Wen Chang, Taoyuan County (TW); Ming-Yuan Lan, Taoyuan Shien (TW); Ching-Cheng Wang, Taoyuan County (TW); Lin-Wei Huang, Taoyuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 335 days.

(21) Appl. No.: 13/720,687

(22) Filed: Dec. 19, 2012

(65) Prior Publication Data
US 2014/0029189 A1   Jan. 30, 2014

(30) Foreign Application Priority Data

Jul. 24, 2012 (TW) .............................. 101126646 A (51) Int. Cl.
*G06F 1/16* (2006.01)

(52) U.S. Cl.
CPC ............ *G06F 1/1662* (2013.01); *G06F 1/1615* (2013.01); *G06F 1/1679* (2013.01); *G06F 1/1681* (2013.01)

(58) Field of Classification Search
CPC ......... G06F 1/16; G06F 1/162; G06F 1/1643; G06F 1/1656; G06F 1/1662; G06F 1/1677; G06F 1/1679; G06F 1/1681
USPC ............. 361/679.22, 679.08, 679.09, 679.27, 361/679.26, 679.21, 679.02, 679.01, 361/679.55–679.58; 248/917–924
See application file for complete search history.

(56) References Cited

U.S. PATENT DOCUMENTS

| | | | |
|---|---|---|---|
| 6,407,909 B1 * | 6/2002 | Kato et al. | 361/679.27 |
| 8,654,520 B2 * | 2/2014 | Lin et al. | 361/679.27 |
| 2003/0109230 A1 | 6/2003 | Duarte et al. | |
| 2013/0242490 A1 * | 9/2013 | Ku | 361/679.3 |

FOREIGN PATENT DOCUMENTS

| | | |
|---|---|---|
| CN | 201583860 U | 9/2010 |
| JP | 4-49494 | 4/1992 |
| JP | 7-56653 | 3/1995 |
| JP | 2000-242363 | 9/2000 |
| JP | 2004-272667 | 9/2004 |
| JP | 2005-149469 | 6/2005 |
| JP | 2005-174348 | 6/2005 |
| JP | 2006-114041 | 4/2006 |
| TW | M394494 U | 12/2010 |
| TW | M434422 U | 7/2012 |

* cited by examiner

*Primary Examiner* — Anthony Haughton
*Assistant Examiner* — Ingrid Wright
(74) *Attorney, Agent, or Firm* — Rabin & Berdo, P.C.

(57) ABSTRACT

A portable electronic device comprises an upper member, a lower member having two guiding grooves, two supports and two connecting members. One end of each support is pivoted to the upper member with a first pivot portion. The other end of each support is pivoted to the lower member with a second pivot portion. One end of each connecting member is pivoted at one side of the upper member, and the other end thereof is restricted in the guiding groove and capable of reciprocally sliding in the guiding groove.

9 Claims, 10 Drawing Sheets

PORTABLE ELECTRONIC DEVICE

RELATED APPLICATIONS

This application claims priority to Taiwan Application Serial Number 101126646, filed Jul. 24, 2012, which is herein incorporated by reference.

BACKGROUND

1. Technical Field

The present invention relates to a portable electronic device, and more particularly to a portable electronic device capable of being automatically unfolded for exposing a keyboard.

2. Description of Related Art

A conventional tablet computer has features of lightness and thinness in shape and easy portability, and a user can touch or write on a touch-controlled display of the tablet computer. Moreover, the tablet computer can be additionally provided with a keyboard device, for example, the tablet computer can stand on one side of the keyboard device, so that the user may use both the keyboard device and the touch-controlled display.

However, when the tablet computer stands on the keyboard device, the situation of the tablet computer shaking or falling backwardly may occur while the user is touching or pressing the touch-controlled display, thus resulting in the inconvenience of operation and lowering the user's willingness to purchase and operate the tablet computer.

Given above, developing a portable electronic device capable of overcoming the mentioned shortcomings and increasing market competitiveness for a company shall be seriously concerned.

SUMMARY

One aspect of the present disclosure is to provide a portable electronic device, which, according to one embodiment, is adopted as a tablet computer, and the tablet computer can be automatically elevated to expose a physical keyboard, so as to achieve a combination of the tablet computer and the keyboard.

According to one embodiment of the present invention, the portable electronic device comprises an upper member, a lower member, two supports, two first pivot portions, two second pivot portions and two connecting members. The upper member has a first side and a second side opposite to each other, and the upper member comprises a display. The lower member has a third side and a fourth side opposite with each other, and the lower member comprises a keyboard and two guiding grooves thereon. The keyboard is disposed on one surface of the lower member and neighboring to the third side thereof. The two guiding grooves are respectively formed on the surface of the lower member and are at two opposite sides of the keyboard, and are extended from the third side towards the fourth side thereof. The guiding groove is formed with a groove opening which is narrower than the guiding groove itself. Each of the two supports comprises a first end and a second end opposite with each other. Each of the first pivot portions enables the first end of the support to be pivoted to one surface of the upper member opposite to the display. Each of the second pivot portions enables the second end of the support to be pivoted to the fourth side of the lower member. One end of each of the connecting members is protruded outwards from the groove opening of the guiding groove and is pivoted to the first side of the upper member, and the other end thereof is limited and slidably disposed in the guiding groove.

When the other end of each of the connecting members is disposed at the third side of the lower member, the upper member, the supports and the lower member are mutually stacked. On the other hand, when the other end of each of the connecting members is disposed in the guiding groove and spaced away from the third side of the lower member, an included angle is formed between the upper member and the lower member.

To sum up, when the portable electronic device is unfolded, and the upper member stands on the lower member, since the upper member is supported by the supports and is also restrained by the connecting members, the upper member is not easy to incline or fall backwardly while the display is touched or pressed, thus preventing the upper member from been shaken and enhancing the stability while the portable electronic device is unfolded. Thus, the convenience of operating the portable electronic device is provided, and the user's willingness for purchasing and operating the portable electronic device is also increased.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
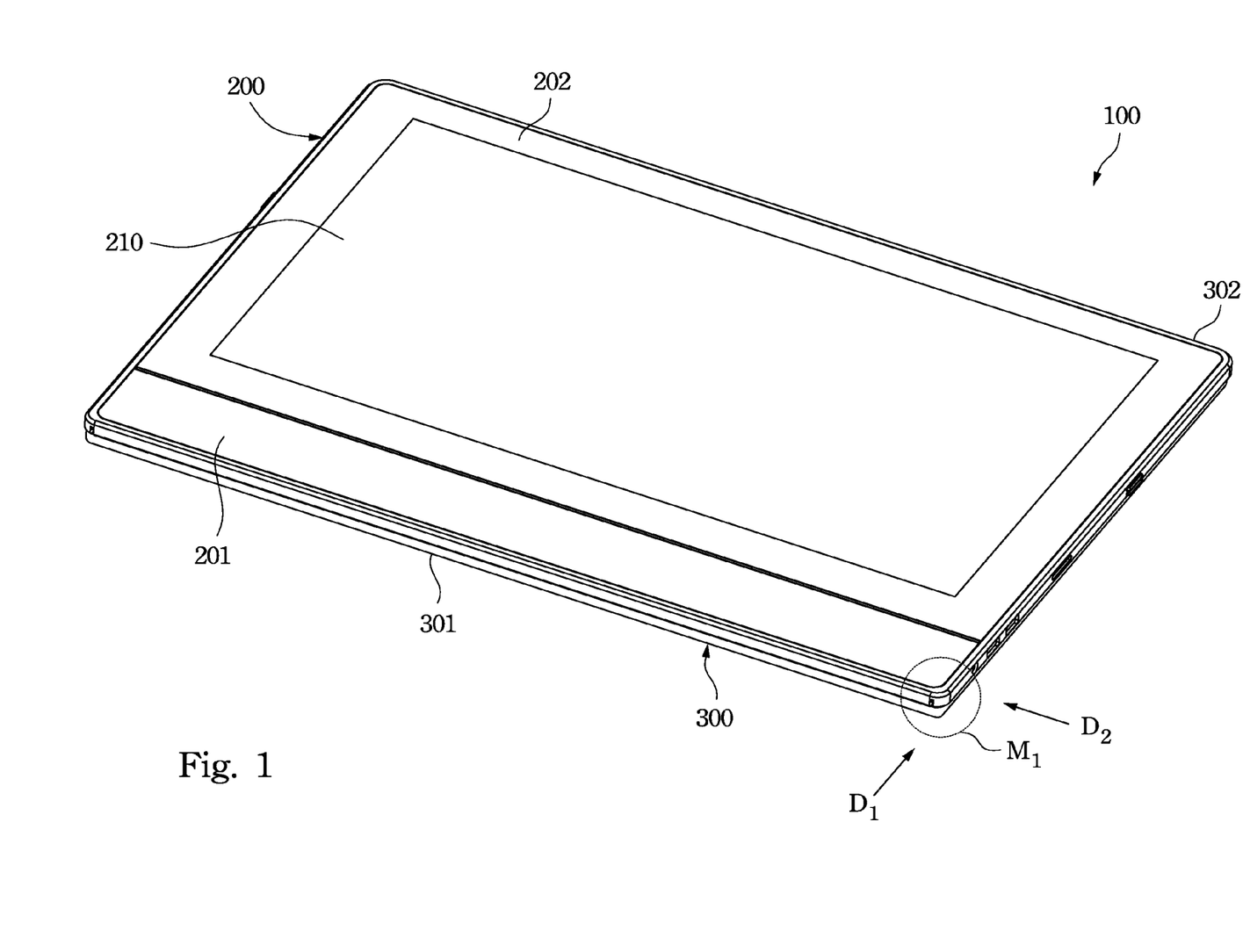
FIG. 1 is a schematic view showing the portable electronic device being in a folded state, according to the present invention.
Figure 2A:
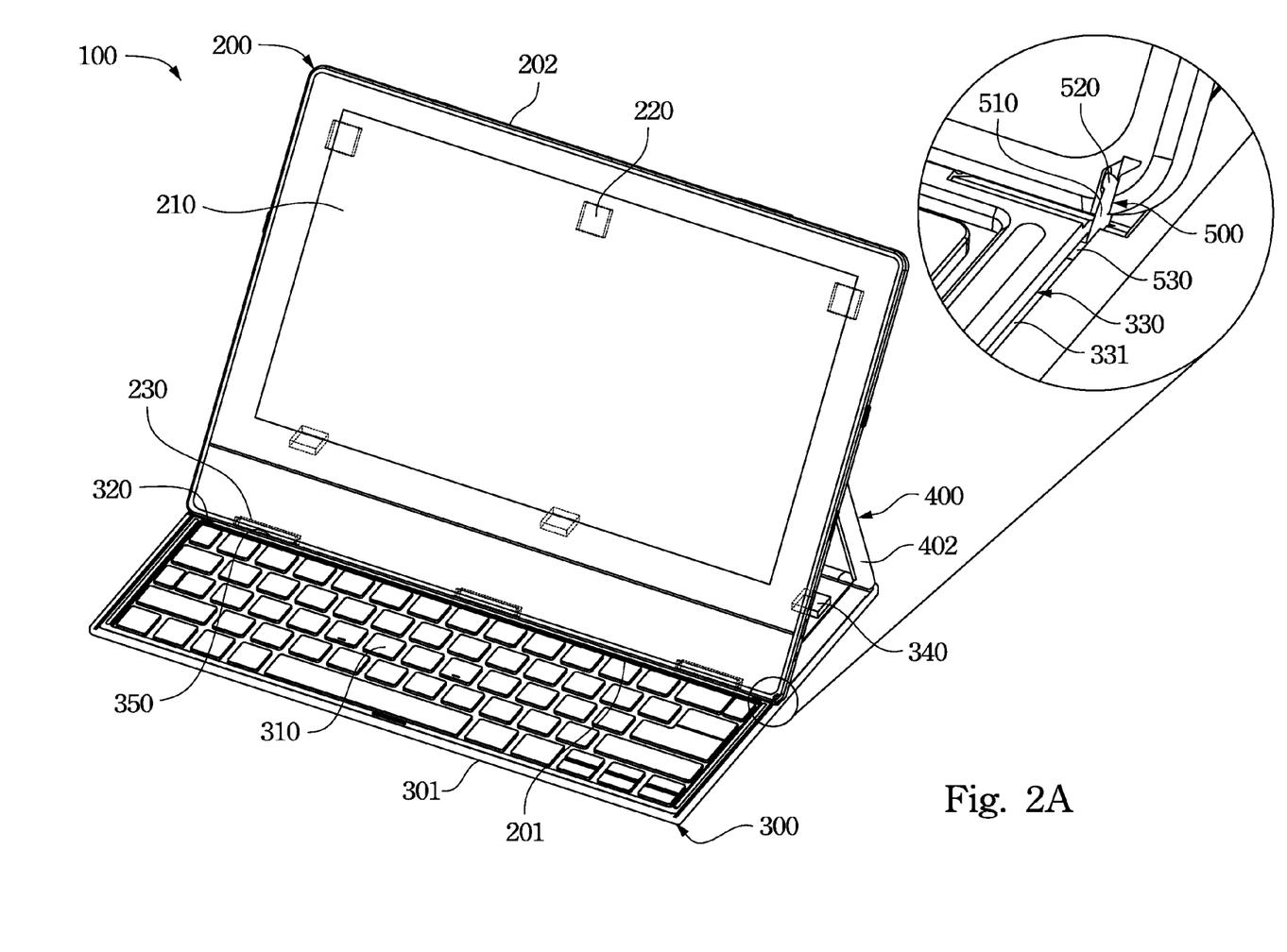
FIG. 2A is a schematic front view illustrating the portable electronic device of FIG. 1 being in an unfolded state, according to the present invention.
Figure 2B:
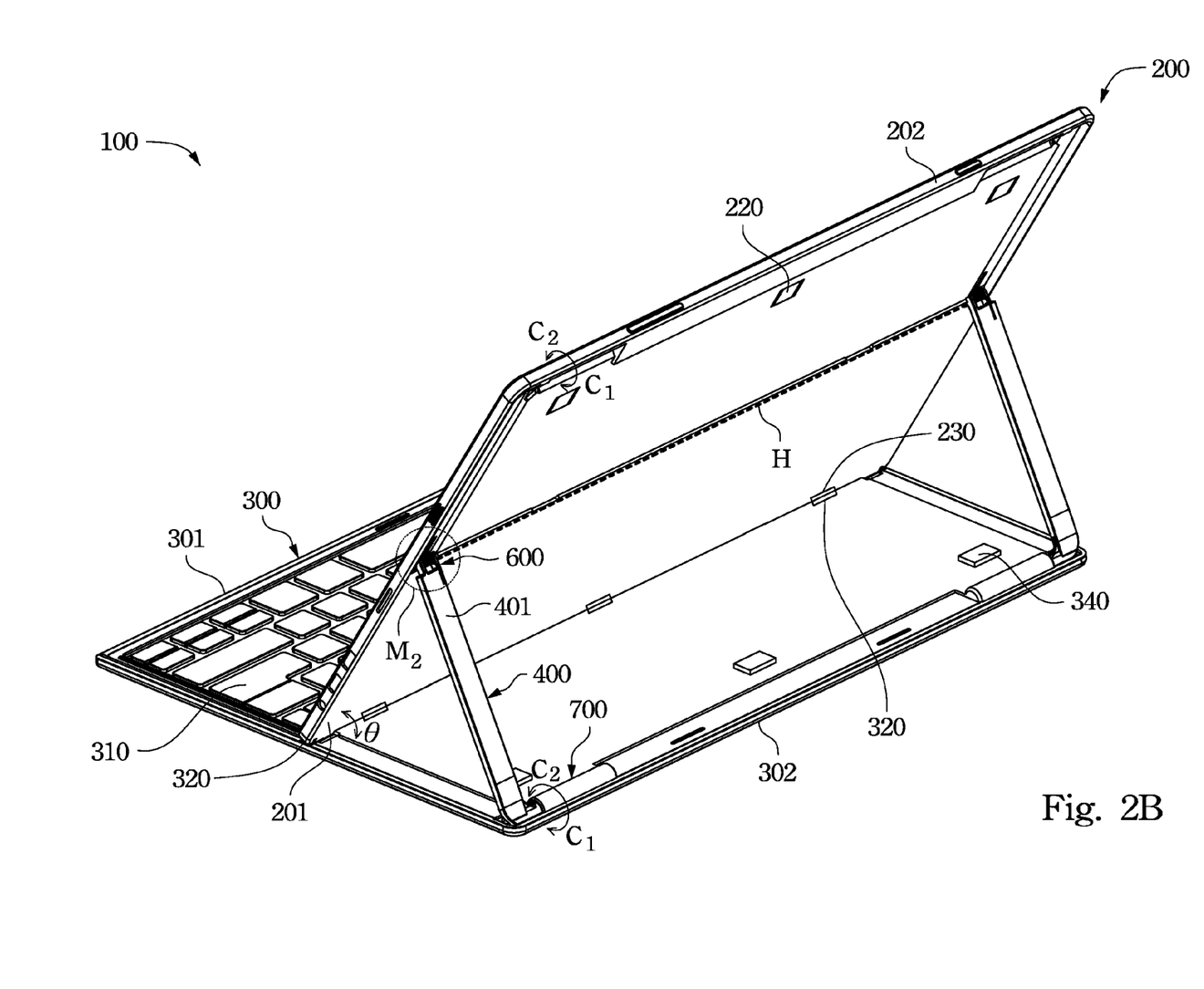
FIG. 2B is a schematic rear view illustrating the portable electronic device of FIG. 1 being in the unfolded state, according to the present invention.
Figure 3:
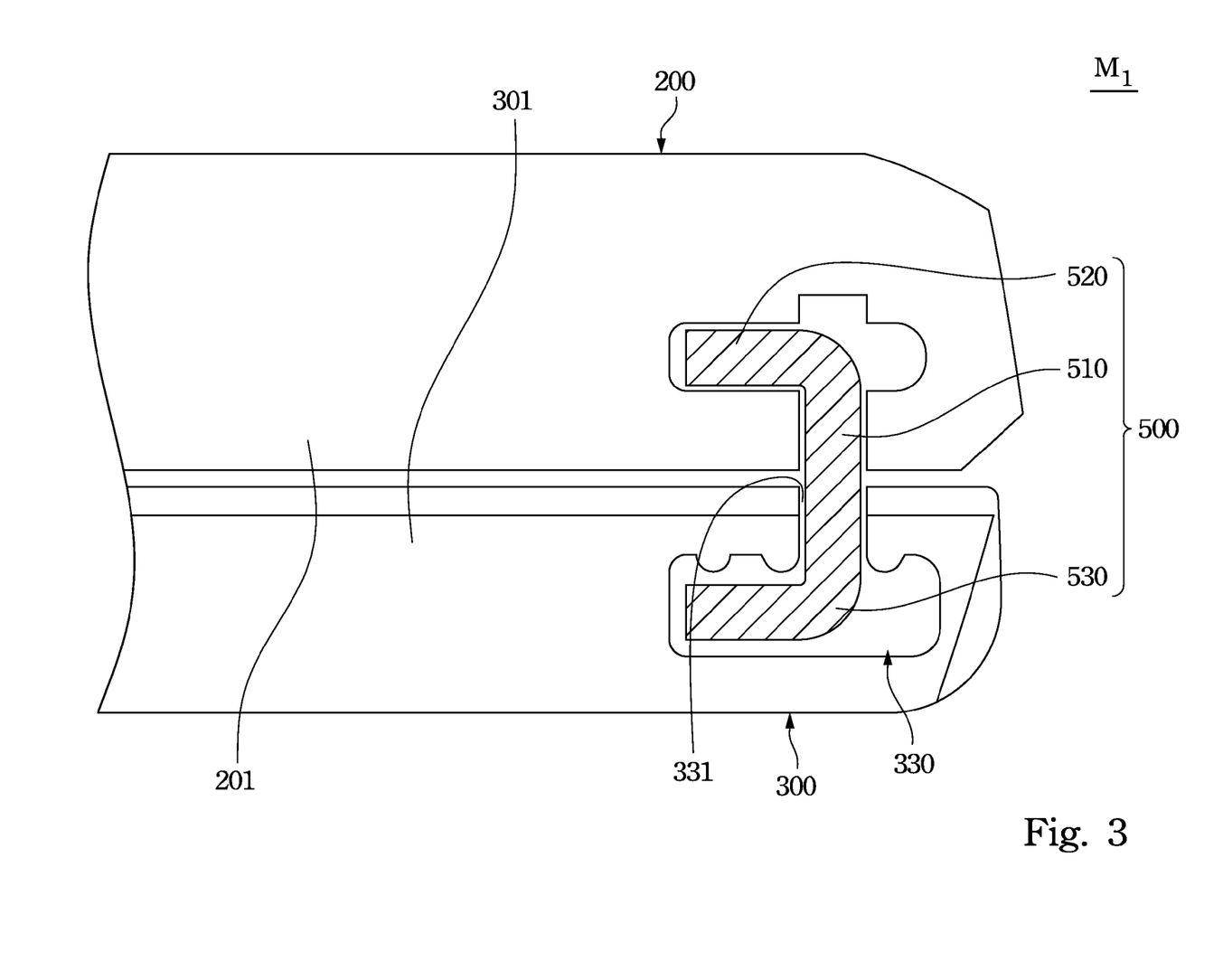
FIG. 3 is a partially enlarged view illustrating an area M1 of FIG. 1 viewed from a direction D1.

Reference is now made to FIG. 1 to FIG. 3, in which FIG. 1 is a schematic view showing the portable electronic device 100 being in a folded state, according to the present invention; FIG. 2A is a schematic front view illustrating the portable electronic device 100 of FIG. 1 being in an unfolded state, according to the present invention; FIG. 2B is a schematic rear view illustrating the portable electronic device 100 of FIG. 1 being in the opened state, according to the present invention; and FIG. 3 is a partially enlarged view illustrating the area M1 of FIG. 1 being viewed from a direction D1.

According to one embodiment of the present invention, the portable electronic device 100 comprises an upper member 200, a lower member 300, two supports 400 and two connecting members 500.

The upper member 200 is defined with a first side 201 and a second side 202 opposite to each other along a longer axis direction of the upper member 200. One surface of the upper member 200 is provided with at least one display 210, and the surface of the upper member 200 opposite to the display 210 is used to be stacked with the lower member 300.

For example, the upper member 200 can be a liquid crystal display (LCD) panel, a touch panel or a tablet computer. According to this embodiment, the upper member 200 is a tablet computer. The tablet computer, for example, comprises a motherboard, a central process unit, a memory unit, a touch-controlled display panel, a hard disk, a battery unit and other essential electronic components enabling the tablet computer to work.

Please refer to FIG. 1 to FIG. 2A. The lower member 300 can be a base, and defined with a third side 301 and a fourth side 302 opposite to each other along the longer axis direction. One surface of the base facing the upper member 200 comprises a keyboard 310, a position limiting groove 320 and two guiding grooves 330. The keyboard 310 is disposed at the third side 301 of the lower member 300. The position limiting groove 320 is transversally disposed at one side of the keyboard 310 away from the third side 301 of the lower member 300, between the third side 301 and the fourth side 302, and in parallel with the third side 301 and the fourth side 302. The two guiding grooves 330 are respectively formed at two opposite sides of the keyboard 310. Each of the guiding grooves 330 is extended from the third side 301 towards to fourth side 302, according to this embodiment, and each of the guiding grooves 330 is only extended to the position limiting groove 320. However, according to the present invention, each of the guiding grooves 330 is not limited to whether being extended to the fourth side 302. Moreover, the guiding groove 330 is formed with a groove opening 331 which is narrower than the guiding groove 330.

Please refer to FIG. 2A and FIG. 2B. Each of the supports 400, such as a connecting rod, is defined with a first end 401 and a second end 402 opposite to each other. The first end 401 of each of the supports 400 utilizes a first pivot portion 600 to pivot the first end 401 of the support 400 to the upper member 200. For example, the two first pivot portions 600 are disposed between the first side 201 and the second side 202 of the upper member 200, or are disposed on an imaginary central line defined between the first side 201 and the second side 202. The second end 402 of each of the supports 400 utilizes a second pivot portion 700 to pivot the second end 402 of the support 400 to the fourth side 302 of the lower member 300.

Please refer to FIG. 2A to FIG. 3. One end of each of the connecting members 500 is received in the corresponding guiding groove 330, and is limited and slidably disposed in the guiding groove 330, and the other end thereof is protruded outwards from the groove opening 331 of the guiding groove 330, and is received and pivoted in the first side 201 of the upper member 200.

Substantially, each of the connecting members 500 comprises a rod unit 510, an upper transversal shaft 520 and a lower transversal shaft 530. The upper transversal shaft 520 and the lower transversal shaft 530 are respectively disposed at two opposite ends of the rod unit 510, and both are protruded towards the same direction from the rod unit 510. The upper transversal shaft 520 is received in the first side 201 of the upper member 200, and is pivoted at the first side 201 of the upper member 200, such that the connecting members 500 can be rotated relative to the upper member 200. The lower transversal shaft 530 is limited in the corresponding guiding groove 330, such that the connecting members 500 can only reciprocally slide between the third side 301 and the fourth side 302 in the guiding groove 330. The rod unit 510 is protruded from the guiding groove 330, and also can reciprocally slide along the groove opening 331 of the guiding groove 330 between the third side 301 and the fourth side 302. Each of the connecting members 500 is formed in U-shaped, I-shaped or J-shaped, and is made of a metal or plastic material for example, but the scope of the present invention is not limited to thereto.

In addition, referring to FIG. 2A and FIG. 2B, the upper member 200 has one or more first magnetic attracting units 220 and third magnetic attracting units 230. The first magnetic attracting unit 220 is disposed at the upper member 200 and between the second side 202 and the first pivot portion 600. Substantially, the first magnetic attracting unit 220 is disposed in the upper member 200, and is between an hypothetical line H connecting the two first pivot portions 600 to the second side 202, or the first magnetic attracting unit 220 is disposed on one surface of the upper member 200 opposite to the display 210, and is between the hypothetical line H connecting the two pivot portions 600 to the second side 202.

The third magnetic attracting unit 230 is disposed on one surface of the upper member 200 opposite to the display 210 and is neighboring to the first side 201. Substantially, the third magnetic attracting unit 230 is disposed in the upper member 200 and is neighboring to the first side 201, or the third magnetic attracting unit 230 is disposed on one surface of the upper member 200 opposite to the display 210 and is neighboring to the first side 201.

The lower member 300 further comprises one or more second magnetic attracting units 340 and fourth magnetic attracting units 350. The second magnetic attracting unit 340 is disposed between the position limiting groove 320 and the fourth side 302 of the lower member 300. Substantially, the second magnetic attracting unit 340 is disposed inside the lower member 300, neighboring to the first side 201, and between the position limiting slot 320 and the fourth side 302 of the lower member 300, or the second magnetic attracting unit 340 is disposed on one surface of the lower member 300 on which the keyboard 310 is provided, and between the position limiting slot 320 and the fourth side 302 of the lower member 300.

The fourth magnetic attracting unit 350 is disposed in the lower member 300 and is at the side of the keyboard 310 opposite to the third side 301 of the lower member 300. For example, the fourth magnetic attracting unit 350 is disposed in the position limiting groove 320. Substantially, the fourth magnetic attracting unit 350 is disposed in the lower member 300 and is at the side of the keyboard 310 opposite to the third side 301, or the fourth magnetic attracting unit 350 is disposed on one surface of the lower member 300 on which the keyboard 310 is provided, and is at the side of the keyboard 310 opposite to the third side 301.

It is noted that the first magnetic attracting unit 220 and the second magnetic attracting unit 340 can be a combination of metal and magnet; or both can be magnets. The third magnetic attracting unit 230 and the fourth magnetic attracting unit 350 can be a combination of metal and magnet; or both can be magnets.

Figure 4:
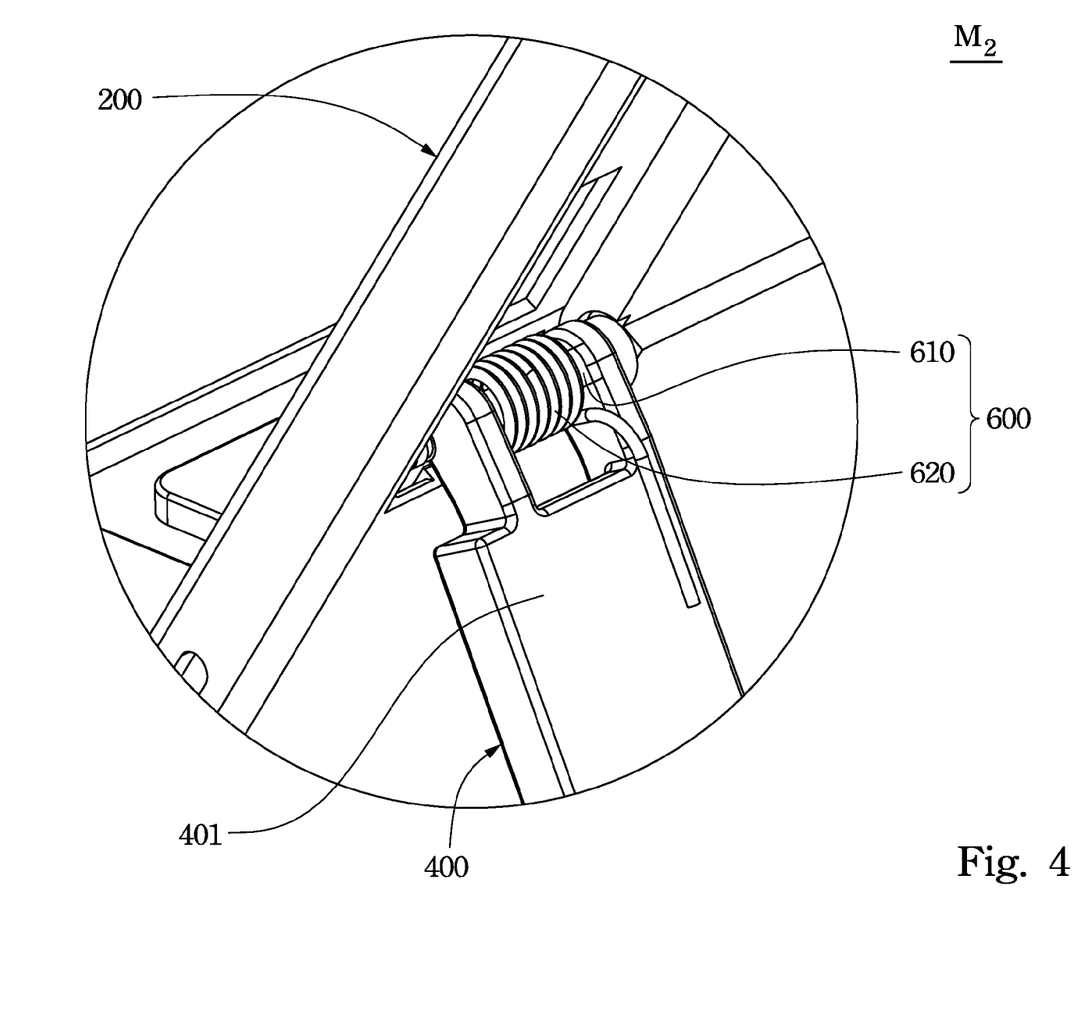
FIG. 4 is an enlarged view illustrating a partial area M2 of FIG. 2B.

Reference is now made to FIG. 2B and FIG. 4 in which FIG. 4 is an enlarged view illustrating the partial area M2 of FIG. 2B.

The mentioned first pivot portion 600 comprises a first shaft rod 610 and a torsion spring 620. The torsion spring 620 is sleeved on the first shaft rod 610, and two opposite ends of the torsion spring 620 are respectively abutted against the upper member 200 and the first end 401 of one of the supports 400. Thus, with the first shaft rods 610, each of the first pivot portions 600 enables the upper member 200 to pivot the first end 401 of the support 400, such that the upper member 200 can be pivotally rotated relative to the first end 401 of the support 400.

Figure 5A:
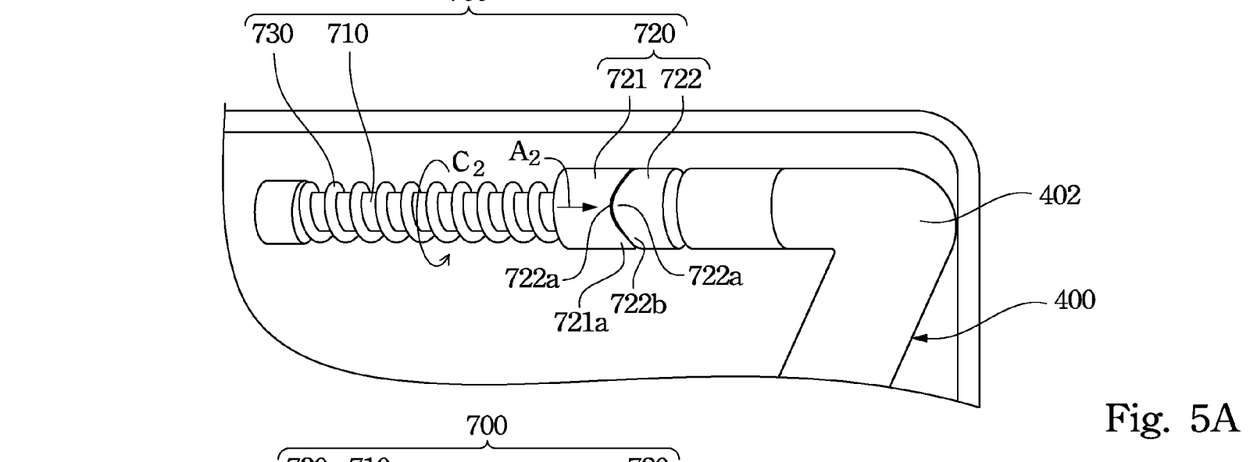
FIG. 5A is an enlarged view illustrating a second pivot portion of FIG. 2B.

FIG. 5A is an enlarged view illustrating the second pivot portion 700 of FIG. 2B. Refer to FIG. 5A. Each of the second pivot portions 700 comprises a second shaft rod 710, a cam set 720 and a compress spring 730. One end of the second shaft rod 710 is connected to the second end 402 of the support 400. The cam set 720 further comprises a first cam 721 and a second cam 722. The first cam 721 is disposed between the second cam 722 and the compress spring 730, and is axially and moveably sleeved on the second shaft rod 710, such that the first cam 721 can be pivotally rotated with the second shaft rod 710, and meanwhile, the first cam 721 also can linearly and reciprocally move on the second shaft rod 710 along the axial direction of the second shaft rod 710. The second cam 722 is secured on the lower member 300 and is sleeved on the second shaft rod 710. The compress spring 730 is sleeved on the second shaft rod 710, and two opposite ends of the compress spring 730 are respectively abutted against the first cam 721 and the other end of the second shaft rod 710.

Substantially, one end surface of the first cam 721 opposite to the compress spring 730 is formed with a convex portion 721a and a concave portion 721b. The end of the second cam 722 adjacent to the first cam 721 is formed with a convex portion 722a and a concave portion 722b. When the first cam 721 and the second cam 722 are mutually abutted through the convex portions 721a, 722a, the compress spring 730 is compressed by the first cam 721 towards the direction of compress spring 730; when the first cam 721 and the second cam 722 are mutually abutted through the convex portions 721a, 722a and the concave portions 721b, 722b, the compress spring 730 is not compressed by the first cam 721.

Figure 6:
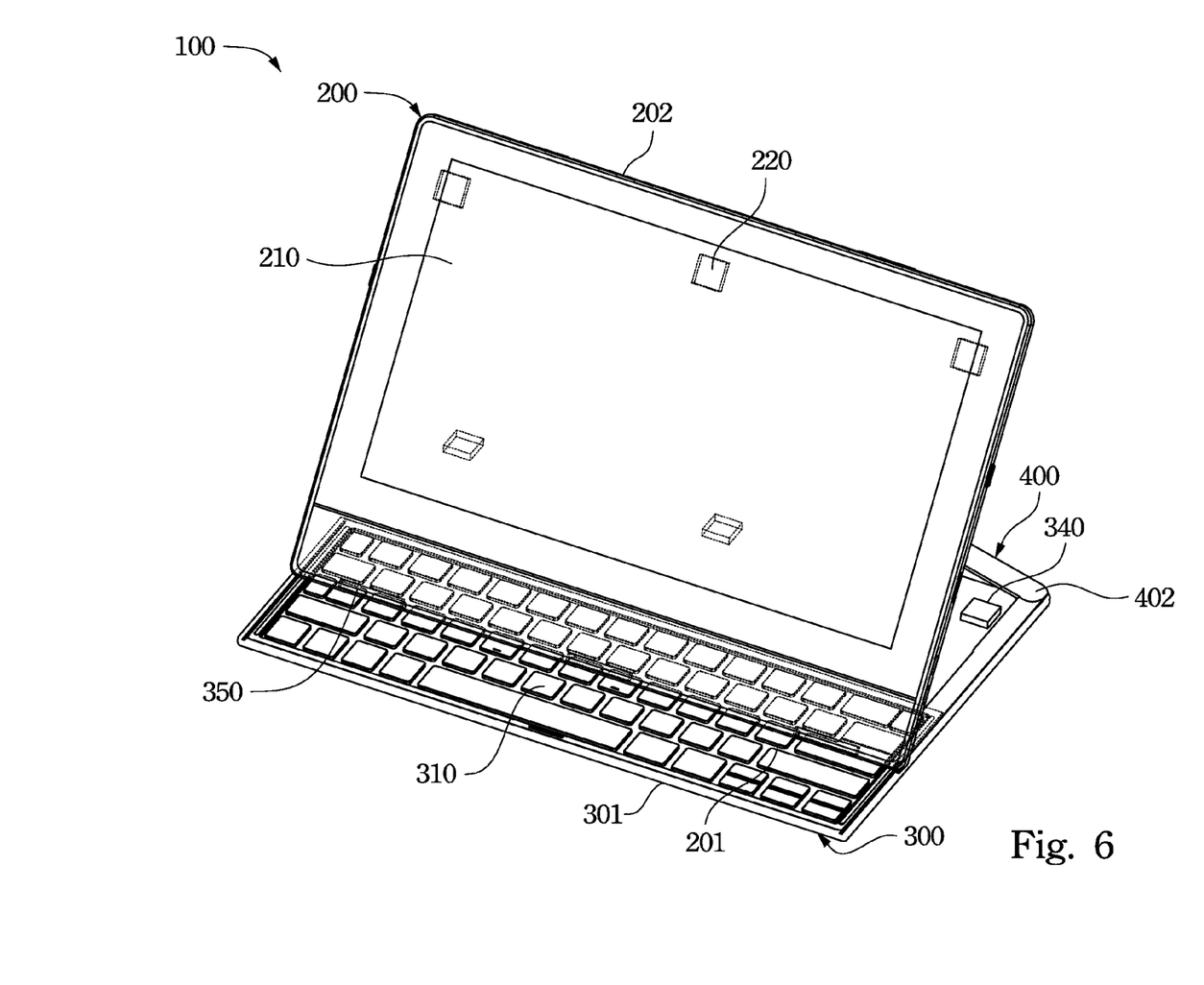
FIG. 6 is a schematic view illustrating the operation of the portable electronic device switched between the folded state and the unfolded state, according to the present invention.

Reference is now made to FIG. 2B and FIG. 6, in which FIG. 6 is a schematic view illustrating the operation of the portable electronic device 100 switched between the folded state and the opened state, according to the present invention.

When an external force is exerted on the upper member 200 by a user, the upper member 200 utilizes the first pivot portions 600 to be rotated along a first clockwise direction C1 relative to the supports 400 (as shown in FIG. 2B), such that the supports 400 are pressed to be close to the lower member 300 (as shown in FIG. 6), and the torsion spring 620 of the first pivot portion 600 (as shown in FIG. 4) is deformed so as to store a recovery force which can be released for subsequent use, and the second end 402 of the support 400 utilizes the second pivot portion 700 to be rotated relative to the lower member 300 along a second clockwise direction C2 opposite to the first clockwise direction C1 (as shown in FIG. 6), until the upper member 200, the two supports 400 and the lower member 300 are horizontally stacked (as shown in FIG. 1) and the two supports 400 are hidden between the upper member 200 and the lower member 300, and thus, a folded state for the portable electronic device 100 is defined.

At this moment, as shown in FIG. 6, because the first magnetic attracting unit 220 of the upper member 200 is aligned with the second magnetic attracting unit 340 of the lower member 300, the first magnetic attracting unit 220 is mutually attracted with the second magnetic attracting unit 340, and thus, the upper member 200 can be fixedly stacked on the lower member 300 (as shown in FIG. 1).

Figure 5B:
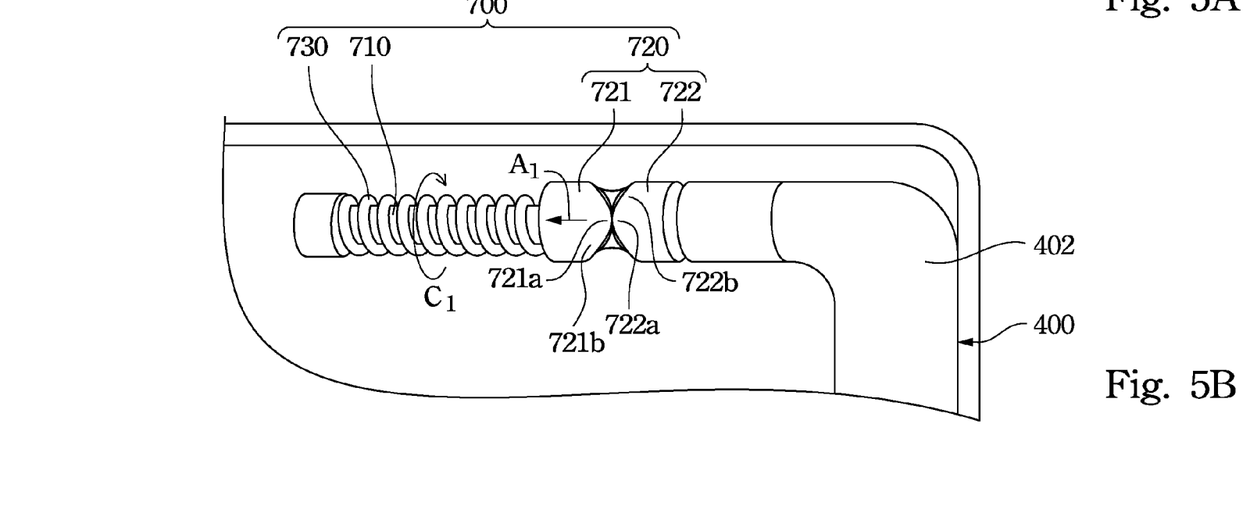
FIG. 5B is a schematic view illustrating the operation of the second pivot portion while the portable electronic device being in the folded state, according to the present invention.

Referring to FIG. 2B and FIG. 5B, when the portable electronic device 100 is about to be in the aforementioned folded state, and when the first cam 721 is rotated with the second shaft rod 710 towards the first clockwise direction C1, the convex portion 721a of the first cam 721 slides from the concave portion 722b of the second cam 722 to the convex portion 722a of the second cam 722, such that the first cam 721 and the second cam 722 are mutually abutted through the convex portions 721a, 722a, and the first cam 721 is transversally moved along an axial direction A1 to compress the compress spring 730. Thus, the compress spring 730 is deformed, thereby generating a recovery force which can be released for subsequent use.

On the other hand, referring to FIG. 2B, FIG. 5A and FIG. 6, when an external force is exerted by a user to make the second side 202 of the upper member 200 to be slightly spaced away from the fourth side 302 of the lower member 300, due to the distance, the first magnetic attracting unit 220 and the second magnetic attracting unit 340 are not able to effectively attract with each other (FIG. 1), and with the recovery force generated by releasing the compress spring 730, the first cam 721 is driven to press the second cam 722 along an axial direction A2, such that the convex portion 721a of the first cam 721 slides from the convex portion 722a of the second cam 722 to the concave portion 722b of the second cam 722, and the first cam 721 and the second shaft rod 710 are rotated towards the second clockwise direction C2 opposite to the first clockwise direction C1. At this moment, the supports 400 are lifted up from the lower member 300 through the rotation of the second shaft rod 710, and thus, the upper member 200 can be upwardly pulled.

At the same moment, with the recovery force generated by releasing the torsion spring 620, the upper member 200 utilizes the first pivot portion 600 to be rotated relative to the support 400 towards the second clockwise direction C2 opposite to the first clockwise direction C1 (as shown in FIG. 2B), such that the second side 202 of the upper member 200 is spaced away from the lower member 300, and with the rotation of the support 400, the first side 201 of the upper member 200 drives the two connecting members 500 to slide towards the fourth side 302 of the lower member 300, in which the lower transversal shafts 530 of the two connecting members 500 at two opposite sides of the upper member 200 are driven to slide in the guiding grooves 330.

When the convex portions 721a, 721b of the first cam 721 and the second cam 722 are completely separated, and after the second cam 722 and the first cam 721 are mutually abutted through the convex portions 721a, 722a and the concave portions 721b, 722b (as shown in FIG. 5A), the second shaft rod 710 and the supports 400 stop rotating.

Referring to FIG. 2B, at this moment, the first side 201 of the upper member 200 is abutted in the mentioned position limiting groove 320, so as to be prevented from further sliding towards the fourth side 302 of the lower member 300. Moreover, because the third magnetic attracting unit 230 is aligned with the fourth magnetic attracting unit 350, the third magnetic unit 230 is mutually attracted with the fourth magnetic unit 350, such that the upper member 200 is enabled to be fixed on the lower member 300 and forms an included angle θ relative to the lower member 300, and thus, an opened state for the portable electronic device 100 is therefore defined.

According to other embodiments of the present invention, a stop protrusion (not shown in figures) can be further provided between the convex portion and the concave portion of the second cam 722, such that, after the second cam 722 and the first cam 721 are mutually abutted through the convex portions and the concave portions, the convex portion of the first cam 721 is stopped by the stop protrusion, and the first cam 721 cannot be further rotated towards the second clockwise direction C2, so as to limit the support 400 from overly rotating towards the direction away from the third side 301 of the lower member 300. The present invention is not limited to the installation of stop protrusion, and a stop mechanism can be further installed in the second pivot portion, such that, after the support 400 is rotated to a certain angle towards the direction away from the third side 301 of the lower member 300, the support 400 is limited by the stop mechanism, thereby preventing excessive rotation which may cause inconvenience in use.

As shown in FIG. 2A, when the connecting member 500 is moved to the distal end of the guiding groove 330, the first side 201 of the upper member 200 can no longer be moved towards the fourth side 302 of the lower member 300, and the lower transversal shafts 530 of the two connecting members 500 are limited in the guiding grooves 330, such that the first side 201 of the upper member 200 is restrained by the lower transversal shafts 530 of the two connecting members 500, and thus, the upper member 200 will not be further driven by the continuous rotation of the supports 400. Thus, when the upper member 200 stands on the lower member 300, the upper member 200 is not easy to incline or fall backwardly while the display 210 is touched or pressed. Thus, the upper member 200 will be prevented from shaking and enhance the stability while the portable electronic device 100 is unfolded.

It is noted that the upper transversal shafts 520 of the two connecting members 500 are moveably pivoted at the first side 201 of the upper member 200, such that, when the first side 201 of the upper member 200 is moved towards the fourth side 302 of the lower member 300, the rotation relative to the upper transversal shaft 520 can be stopped for being adjusted to a proper displace angle, such that the rotation of the upper member 200 can be smoother.

Figure 7:
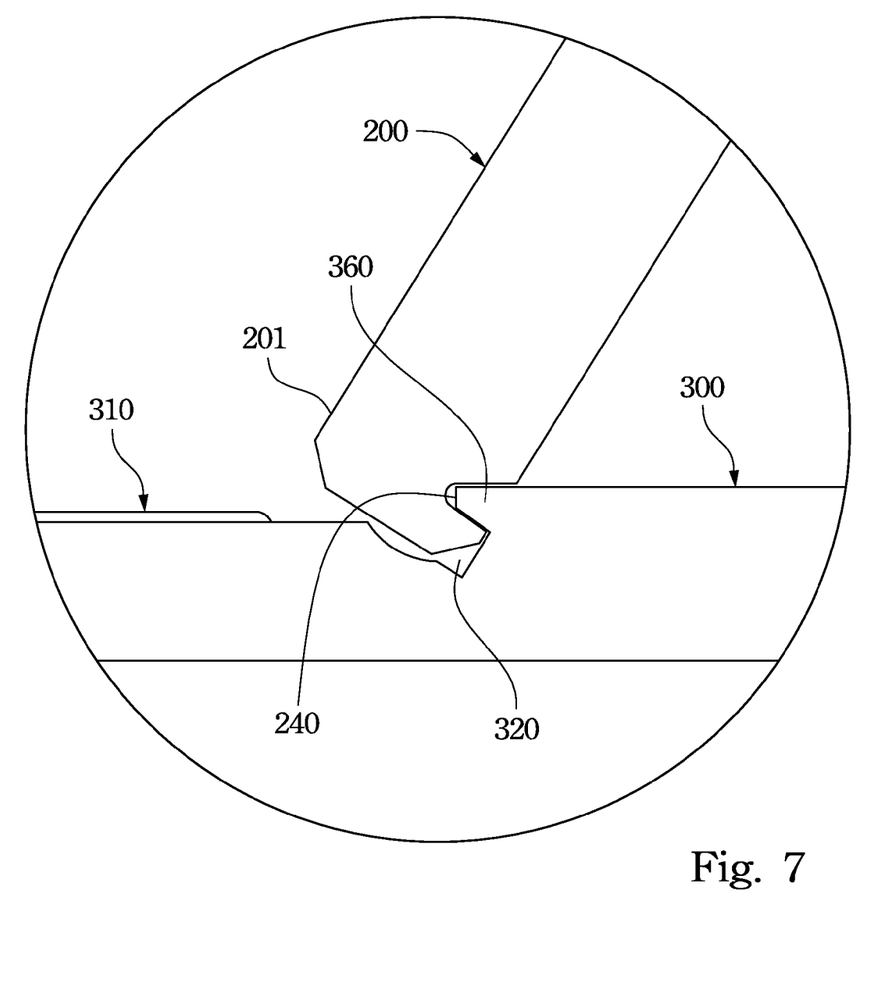
FIG. 7 is a partial lateral view illustrating the portable electronic device being in an unfolded state, according to one embodiment of the present invention.

In addition, FIG. 7 is a partial lateral view illustrating the portable electronic device 100 being in an unfolded state, according to one embodiment of the present invention.

Referring to FIG. 2B and FIG. 7, the upper member 200 further comprises one or more latch grooves 240. The latch groove 240 is formed on one surface of the upper member 200 opposite to the display 210 and is neighboring to the first side 201. The lower member 300 further comprises one or more convex teeth 360. The convex tooth 360 is formed in the lower member 300 and is at the side of the keyboard 310 opposite to the third side 301, and for example, is formed at the upper edge of the mentioned position limiting groove 320. The quantity of the convex tooth 360 is the same as the quantity of the latch groove 240.

Thus, when the portable electronic device 100 is in an unfolded state, i.e. the upper member 200 stands on the lower member 300, because the convex tooth 360 is aligned with the latch groove 240, the convex tooth 360 can be latched in the latch groove 240, thereby allowing the upper member 200 to be fixedly upright on the lower member 300, and preventing from being driven by the continuous rotation of the supports 400.

Figure 8:
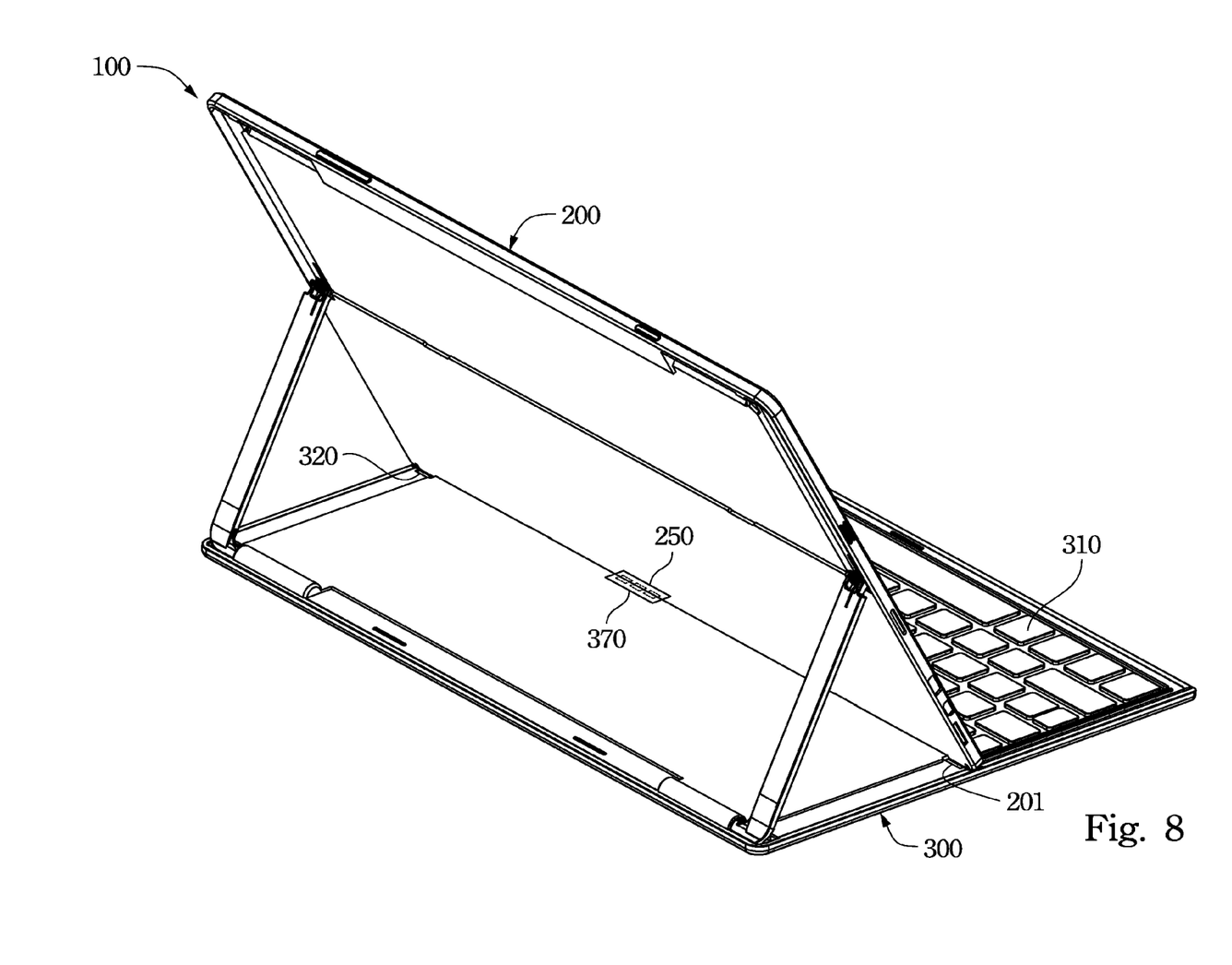
FIG. 8 is a schematic view illustrating the portable electronic device being in the unfolded state, according to another embodiment of the present invention.

FIG. 8 is a schematic view illustrating the portable electronic device 100 being in the unfolded state, according to another embodiment of the present invention.

The upper member 200 further comprises a first electrical connector 250 (such as a probe type connector, a pogo pin or a USB connector), and the first electrical connector 250 is disposed on one surface of the upper member 200 opposite to the display 210 and neighboring to the first side 201. The lower member 300 further comprises a second electrical connector 370 (such as a probe type connector, a pogo pin or a USB connector), the second electrical connector 370 is disposed in the lower member 300 and is at the side of the keyboard 310 opposite to the third side 301, and for example, is formed at the upper edge of the mentioned position limiting groove 320.

Thus, when the portable electronic device 100 is in the unfolded state, the upper member 200 stands on the lower member 300, and the first electrical connector 250 is connected with the second electrical connector 370, and thus, signals can be transferred between the upper member 200 and the lower member 300.

However, the present invention is not limited to the above disclosure, a signal cable (not shown in figures) of the lower member 300 can be connected to the upper member 200 through the second pivot portion along one of the supports, or the upper member 200 and the lower member 300 can be wirelessly electrically connected with each other, for example, through Bluetooth protocol.

Figure 9:
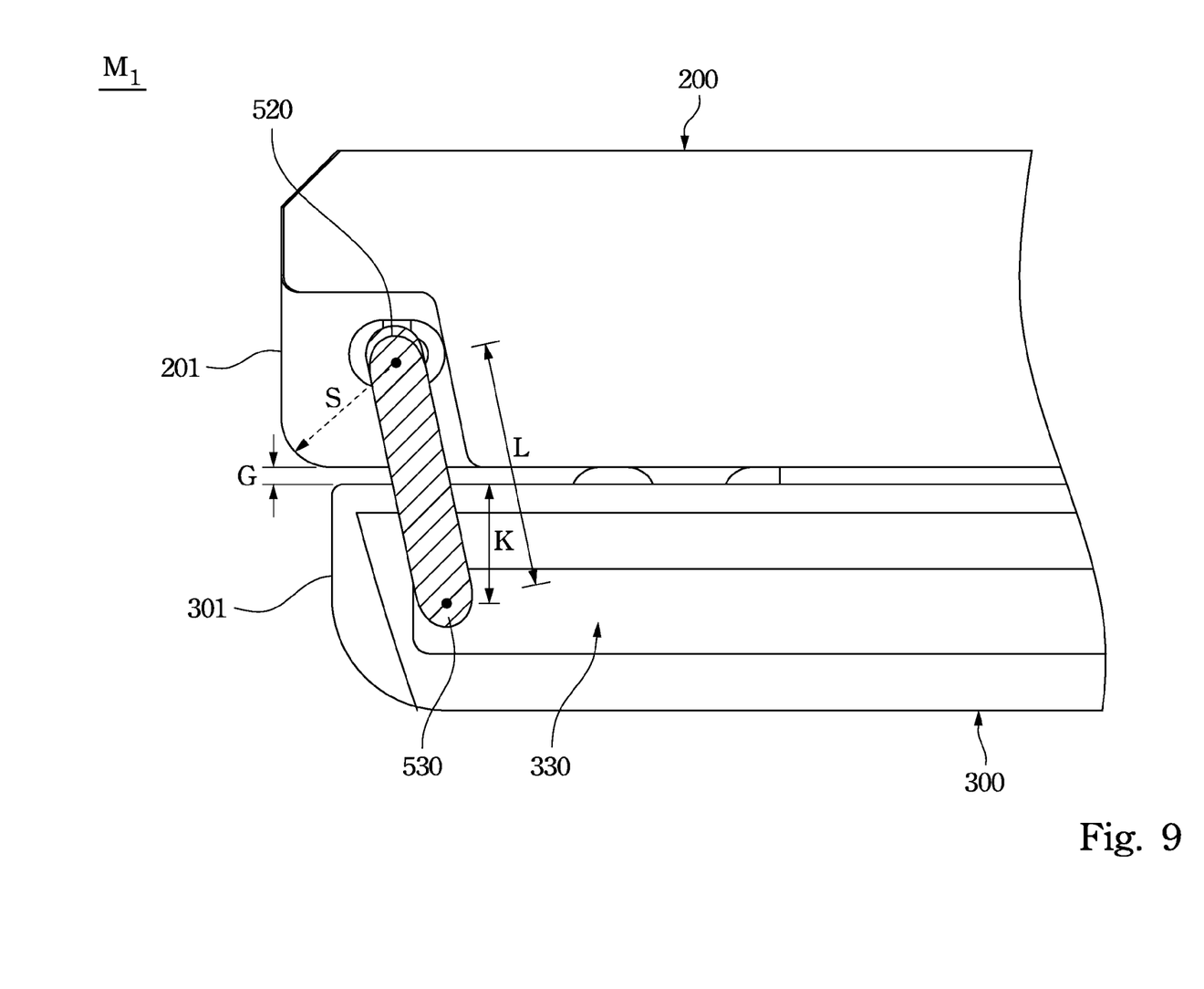
FIG. 9 is a partially enlarged view illustrating the area M1 of FIG. 1 being viewed from a direction D2.

FIG. 9 is a partially enlarged view illustrating the area M1 of FIG. 1 being viewed from a direction D2.

According to one embodiment of the present invention, for the upper member 200 standing on the lower member 300 in a smoother manner while being in the unfolded state, the length L of the rod unit 510 can be designed to be greater than the sum of (1) a maximum distance S defined from the upper transversal shaft 520 (e.g., the shaft core position) of the connecting member 500 to the connecting location at which the surface of the upper member 200 opposite to the display 210 is connected with the first side 201, (2) a gap G defined while the upper member 200 is stacked with the lower member 300 and (3) a minimum distance K defined from the lower transversal shaft 530 (e.g., the shaft core position) of the connecting member 500 to the surface of the lower member 300 facing the upper member 200. In other words, the height of the connecting member 500 (the length of the rod unit 510) has to be greater than the sum of the maximum distance S+ the gap G+ the minimum distance K.

Thus, when the portable electronic device 100 is operated into the unfolded state, the upper member 200 is rotated relative to the upper transversal shaft 520 of the connecting member 500, and the connecting location of the surface of the upper member 200 opposite to the display 210 connected with the first side 201 can freely pass through the bottom of the lower member 300, and is prevented from being stopped by the surface of the lower member 300 facing the upper member 200.

In sum, when the portable electronic device is unfolded, and the upper member stands on the lower member, the upper member is supported by the supports and is also restrained by the connecting members, such that the upper member is prevented from backwardly inclining or falling while the display being touched or pressed, thereby avoiding shaking and enhancing the stability while the portable electronic device is being unfolded. Thus, the convenience of operating the portable electronic device is provided, and the user's willingness for purchasing and operating the portable electronic device is also increased.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A portable electronic device, comprising:
   an upper member having a first side and a second side opposite to each other, the upper member comprising a display;
   a lower member having a third side and a fourth side opposite to each other, the lower member comprising:
      a keyboard which is disposed on a surface of the lower member and is neighboring to the third side; and
      two guiding grooves which are respectively formed on the surface of the lower member and are disposed at two opposite sides of the keyboard and are extended from the third side towards the fourth side, each of the guiding grooves being formed with a groove opening which is narrower than the guiding groove;
   two supports each of which comprises a first end and a second end opposite to each other;
   two first pivot portions respectively enabling the first ends of the supports to be pivoted at a surface of the upper member opposite to the display;
   two second pivot portions respectively enabling the second ends of the supports to be pivoted at the fourth side of the lower member; and
   two connecting members, one end of each of the connecting members protruding outwards from the groove opening and being pivoted to the first side of the upper member, and the other end of each of the connecting members being limited and slidably disposed in the guiding groove, each of the connecting members comprising:
      a rod unit disposed in the groove opening of the guiding groove;
      an upper transversal shaft disposed at one end of the rod unit, outside the groove opening, extending towards one direction, and pivoted to the first side of the upper member; and
      a lower transversal shaft disposed at the other end of the rod unit, extending towards the same direction to which the upper transversal shaft extends, and being limited in the guiding groove, and being enabled to reciprocally slide between the first side and the second side of the upper member,
   wherein when the other end of each of the connecting members is disposed at the third side of the lower member, the upper member, the supports and the lower member are mutually stacked, and
   when the other end of each of the connecting members is spaced away from the third side of the lower member, the upper member stands on the lower member, thereby forming an included angle between the upper member and the lower member.

2. The portable electronic device according to claim 1, wherein each of the first pivot portions comprises:
   a first shaft rod pivoted at the first ends of the supports and the surface of the upper member opposite to the display;
   a torsion spring sleeved on the first shaft rod, two opposite ends of the torsion spring respectively being abutted against the upper member and the first end of one of the supports;
   wherein when the upper member, the supports and the lower member are mutually stacked, and the torsion spring is deformed so as to store a recovery force.

3. The portable electronic device according to claim 1, wherein each of the second pivot portions comprises:
   a second shaft rod, wherein one end of the second shaft rod is connected to the second end of one of the supports;
   a cam set, comprising:
      a first cam axially and moveably sleeved on the second shaft rod; and
      a second cam which is secured in the lower member and is sleeved on the second shaft rod; and
   a compress spring which is sleeved on the second shaft rod and is abutted against the first cam and the other end of the second shaft rod,
   wherein when the upper member, the supports and the lower member are mutually stacked, the first cam and the second cam are mutually abutted through their corresponding convex portions, thereby compressing the compress spring; and
   when the upper member stands on the lower member, the convex portions of the first cam and the second cam are separated, and the first cam is enabled to be rotated so as to drive the second shaft rod to be rotated, such that the second cam and the first cam are mutually abutted through their concave portions and convex portions.

4. The portable electronic device according to claim 1, wherein the upper member has at least one first magnetic attracting unit, and the at least one first magnetic attracting unit is disposed between a hypothetical line connecting the two first pivot portions to the second side;
   the lower member has at least one second magnetic attracting unit, and the at least one second magnetic attracting unit is disposed between the keyboard and the fourth side; and
   wherein when the upper member, the supports and the lower member are mutually stacked, and the first magnetic attracting unit is mutually attracted with the second magnetic attracting unit, thereby allowing the upper member to be fixed on the lower member.

5. The portable electronic device according to claim 1, wherein the lower member further comprises:
- a position limiting groove which is transversally disposed on one surface of the lower member and is at one side of the keyboard opposite to the third side of the lower member, and
- wherein when the upper member stands on the lower member, the first side of the upper member is abutted against the position limiting groove.

6. The portable electronic device according to claim 5, wherein the upper member has at least one third magnetic attracting unit, and the at least one third magnetic attracting unit is disposed on the surface of the upper member opposite to the display and neighboring to the first side; and
- the lower member has at least one fourth magnetic attracting unit, and the at least one fourth magnetic attracting unit is disposed at an upper edge of the position limiting groove; and
- wherein when the upper member stands on the lower member, the third magnetic attracting unit is mutually attracted with the fourth magnetic attracting unit such that the upper member is fixed on the lower member.

7. The portable electronic device according to claim 5, wherein the upper member has at least one latch groove, and the at least one latch groove is disposed on the surface of the upper member opposite to the display and is neighboring to the first side;
- the lower member has at least one convex tooth, and the at least one convex tooth is disposed at the upper edge of the position limiting groove; and
- wherein when the upper member stands on the lower member, the convex tooth is latched in the latch groove such that the upper member is fixed on the lower member.

8. The portable electronic device according to claim 1, wherein the upper member has at least one first electrical connector which is disposed on the surface of the upper member opposite to the display and is neighboring to the first side, and the lower member has at least one second electrical connector disposed at the one side of the keyboard opposite to the first side; wherein when the upper member stands on the lower member, the first electrical connector is connected with the second electrical connector.

9. The portable electronic device according to claim 8, wherein a length of the rod unit is greater than a sum of a maximum distance, a gap and a minimum distance, wherein the maximum distance is defined from the upper transversal shaft of the connecting member to a connecting location at which the surface of the upper member opposite to the display is connected with the first side, and a gap is defined between the upper member and the lower member which are stacked with each other, and a minimum distance is defined from the lower transversal shaft of the connecting member to the surface of the lower member facing the upper member.

* * * * *